No. 657,464. Patented Sept. 4, 1900.
E. S. SLOAN.
REVERSING GEAR.
(Application filed Apr. 9, 1900.)

(No Model.)

WITNESSES:
William P. Gaebel
Isaac B. Owens

INVENTOR
Elgan S. Sloan
BY
Munn
ATTORNEYS

THE NORRIS PETERS CO., PHOTO-LITHO., WASHINGTON, D. C.

UNITED STATES PATENT OFFICE.

ELGAN S. SLOAN, OF ELK CITY, PENNSYLVANIA.

REVERSING-GEAR.

SPECIFICATION forming part of Letters Patent No. 657,464, dated September 4, 1900.

Application filed April 9, 1900. Serial No. 12,105. (No model.)

*To all whom it may concern:*

Be it known that I, ELGAN S. SLOAN, a citizen of the United States, and a resident of Elk City, in the county of Clarion and State of Pennsylvania, have invented a new and Improved Reversing-Gear, of which the following is a full, clear, and exact description.

This invention relates to certain gearing by means of which a pulley or other revoluble member may be driven in either direction.

This specification is the disclosure of one form of my invention, while the claim defines the actual scope thereof.

Reference is to be had to the accompanying drawings, forming a part of this specification, in which similar characters of reference indicate corresponding parts in all the views.

Figure 1:
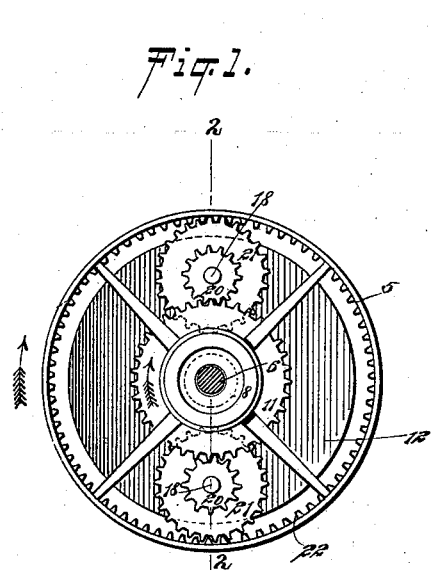
Figure 2:
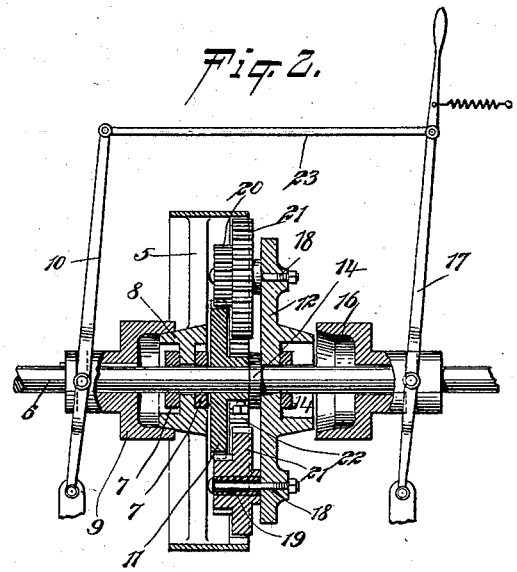
Figure 3:
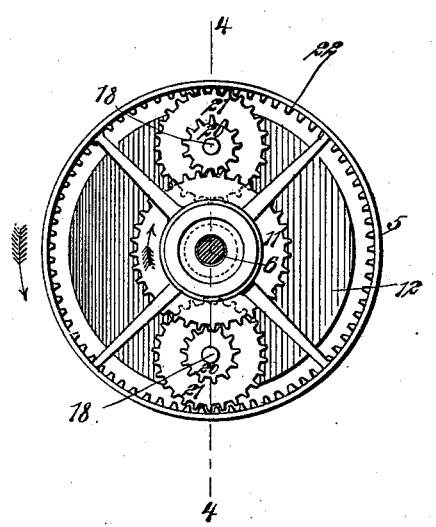
Figure 4:
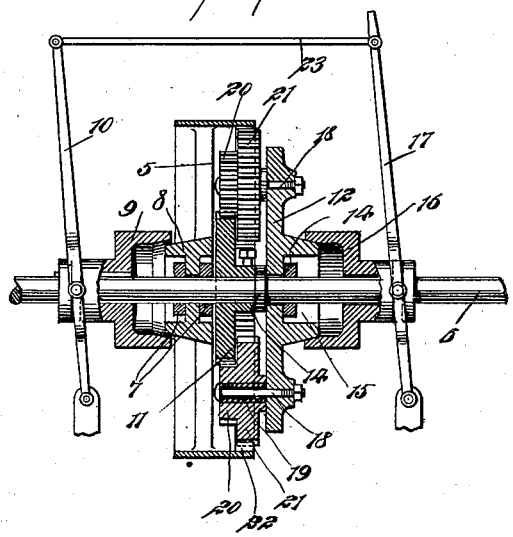

Figure 1 is an elevation of the invention, with the shaft in section. Fig. 2 is a sectional view on the line 2 2 of Fig. 1. Fig. 3 is a view similar to Fig. 1 except that the pulley is supposed to be driven in the opposite direction, and Fig. 4 is a sectional view on the line 4 4 of Fig. 3.

The pulley 5 or other revoluble member is mounted loosely on the continuously-driven shaft 6, the pulley being held from sliding by means of collars 7, fast to the shaft. The hub of the pulley 5 is formed with a clutch member 8 thereon, which is arranged to coact with the clutch member 9, splined on the shaft 6 and actuated by a lever 10. By means of the clutch members 8 and 9 the wheel 5 may be rendered fast to the shaft 6 and driven therewith in the same direction that the shaft is turning. For driving the pulley 5 in an opposite or reverse direction I provide mechanism which will now be described.

Secured fast to the shaft 6, alongside the pulley 5, is a spur-gear 11. The shaft 6 also carries loosely a disk 12, held from sliding by means of collars 14, secured to the shaft 6. The disk 12 has a clutch member 15 formed thereon, and this member is adapted to engage a coacting member 16, through which the shaft 6 passes loosely, the clutch member 16 being held from rotation by means of a lever 17, which also serves to move the clutch member toward and from the disk 12 to engage and disengage the clutch members 15 and 16. When these members are engaged, the disk 12 is held stationary, and when the clutch members are disengaged the disk 12 is free to turn. The disk 12 carries two bolts 18, which project inward toward the pulley 5 and carry rigidly the respective thimbles 19. On these thimbles are loosely mounted double-faced gears, each comprising a small or pinion gear 20 and a larger or spur gear 21. The smaller or pinion gears 20 mesh with the spur-gear 11, and the spur-gears 21 mesh with interior teeth 22, formed inside of the face of the pulley 5. The levers 10 and 17 are connected by a link 23, so that the two levers may be swung in unison, thus throwing one of the clutch members 9 or 16 out of action, while the other clutch member is engaged.

The adjustment shown in Figs. 1 and 2 is that in which the clutch member 9 is engaged with the member 8, and consequently the wheel 6 is driven in the direction of the shaft 6. To reverse the movement of the wheel 5, the levers 10 and 17 should be thrown from the position shown in Fig. 2 to that shown in Fig. 4, which will disengage the clutch member 9 and engage the clutch member 16. The engagement of the clutch member 16 with the part 15 of the disk 12 serves to hold the disk against rotation, and then the spur-gear 11, turning continuously with the shaft 6, will transmit movement to the double gears 20 and 21, which in turn will drive the wheel 5 in a direction in reverse to the direction in which the shaft 6 is driven. By throwing the levers 10 and 17 to a position intermediate those positions shown in Figs. 2 and 4 both clutch members 9 and 16 will be rendered inactive, and the wheel 5 will not be driven in either direction.

I desire it understood that this specification is only a specific description of the invention. Therefore various changes in the form, proportions, and minor details of my invention may be resorted to without departing from the spirit and scope of my invention. Hence I consider myself entitled to all such variations as may lie within the scope of my claim.

Having thus described my invention, I claim as new and desire to secure by Letters Patent—

In a reversing-gear, the combination with a revoluble shaft, of a pulley mounted loosely thereon, collars fast on the shaft and bearing on opposite sides of the pulley to prevent the sliding thereof, the hub of the pulley being formed into a clutch member, a second clutch member splined on the shaft and engageable with the clutch member on the hub of the pulley to fasten the pulley to the shaft, a third clutch member mounted loosely on the shaft, means for holding the third clutch member to slide but not to turn, a member mounted loosely on the shaft and comprising a clutch member engageable with the third clutch member, whereby the said member on the shaft may be held stationary with respect thereto, a double-faced gear-wheel mounted to turn on the said member which is mounted loosely on the shaft, one face of said gear-wheel being meshed with teeth on the pulley, and a gear-wheel fast to the shaft and meshing with the other face of said double-faced gear-wheel.

ELGAN S. SLOAN.

Witnesses:
THOS. BROWN,
ARCHIE EDWARDS.